April 30, 1963 P. GREGER ET AL 3,087,380
ADJUSTABLE MECHANICAL SCANNING DEVICE FOR
POINTERS OF INDICATING METERS
Filed July 10, 1961 4 Sheets-Sheet 3

INVENTORS
PAUL GREGER
OSKAR FISCHER
By Blum, Moscovitz, Friedman
and Blum
Attorneys 3,087,380
ADJUSTABLE MECHANICAL SCANNING DEVICE
FOR POINTERS OF INDICATING METERS
Paul Greger, Braunschweig, and Oskar Fischer, Braunschweig-Volkmarode, Germany, assignors to Voigtlander A.G., Braunschweig, Germany, a corporation of Germany
Filed July 10, 1961, Ser. No. 123,582
Claims priority, application Germany July 9, 1960
15 Claims. (Cl. 88—23)

This invention relates to mechanically scanning devices for the indicating position of the indicator or pointer of an indicating instrument such as, for example, the indicating pointer of an electric exposure meter built into a photographic camera.

In U.S. Patent No. 2,982,190, issued May 2, 1961, there is shown and described a mechanical scanning device including locking means for arresting an exposure meter pointer in its indicating position at any time the indicating postion thereof is to be scanned. A reset indicator or scanner member is moved to engage the exposure meter pointer, as the latter is arrested at its indicating position and, upon contact with the arrested pointer, the scanner member becomes firmly engaged with an arcuate clamping surface cooperable with its outer or free end. This clamping surface is fixed in position, and the locking action does not require any special expenditure of energy as it is direct and firmly secures the reset indicator against any displacement. Exposure condition setters, such as a diaphragm opening setter, a shutter time setter, and the like are actuated in accordance with the travel of the scanner member from its rest position to its scanning position in which it engages the exposure meter pointer.

The present invention is directed to improvements upon the invention shown and described in said U.S. Patent No. 2,982,190. More particularly, the present invention is directed to novel adjusting means for the scanner member, by means of which the scanner member may be adjustably pre-set relative to the pointer and the clamping surface so that any possibility of excessive pressure on the pointer of the exposure meter may be avoided.

In the arrangement shown in said U.S. Patent No. 2,982,190, the reset indicator or scanner member is pivoted eccentrically to an element rotatable about a stationary axis and, on rotation of such element, the scanner member sweeps through the measuring range of the instrument pointer. During such sweeping, the free end of the reset indicator remains at a slight radial distance from the stationary arcuate clamping surface. As the clamping surface is concentric with the stationary axis of the element, the pivotal axis of the scanner member is somewhat eccentric with respect to the center of curvature of the arcuate clamping surface. Thus, with the carrier elements stationary, if the scanner member is swung about its pivot thereon, the free end of the scanner member describes an arc intersecting the clamping surface. These two arcs intersect at an angle which is smaller than the angle of friction between the arcuate clamping surface and the free end of the scanner member.

In accordance with the present invention, excessive play, between the point at which the scanner member engages the pointer of the instrument and the point at which the clamping effect takes place, is reduced to a minimum or eliminated by making the scanner member adjustable both with respect to the radial spacing of its free end from the arcuate clamping surface and with respect to the angle between the scanner member and the instrument pointer when the two are in engagement in the scanning position of the scanner member. Adjustment of the angle between the pointer and the scanner member in the scanning position of the latter effects a corresponding adjustment of the angle, at the point of intersection, between the tangent to the fixed arcuate clamping surface and the tangent to the arc of movement of the free end of the scanner member. The two angles corespond when the center of rotation of the exposure meter pointer and the center of curvature of the clamping surface coincide.

For an understanding of the principles of the invention, reference is made to the following description of typical embodiments thereof as illustrated in the accompanying drawings. In the drawings.

Figure 1:
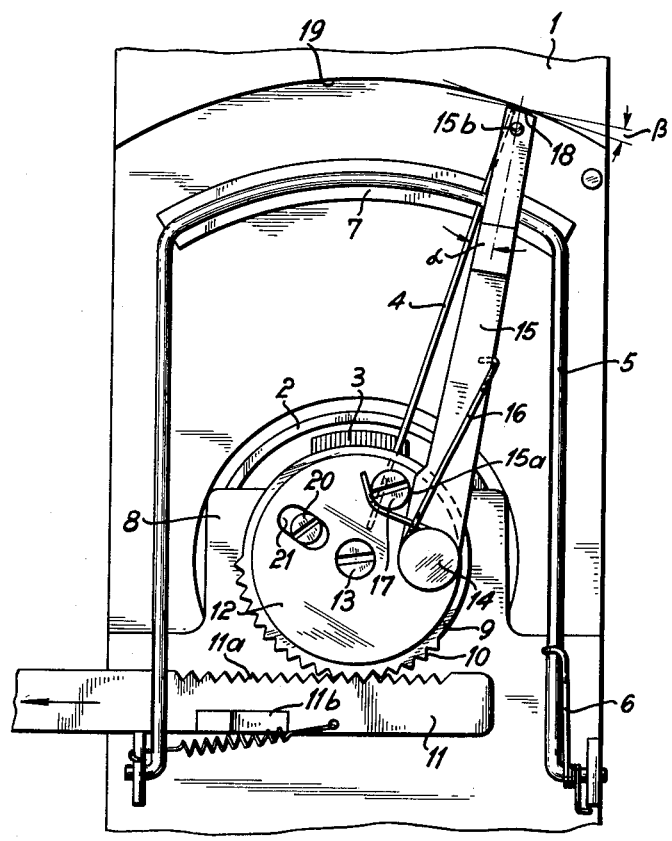
FIG. 1 is a plan view of one form of mechanical scanning device embodying the invention.
Figure 2:
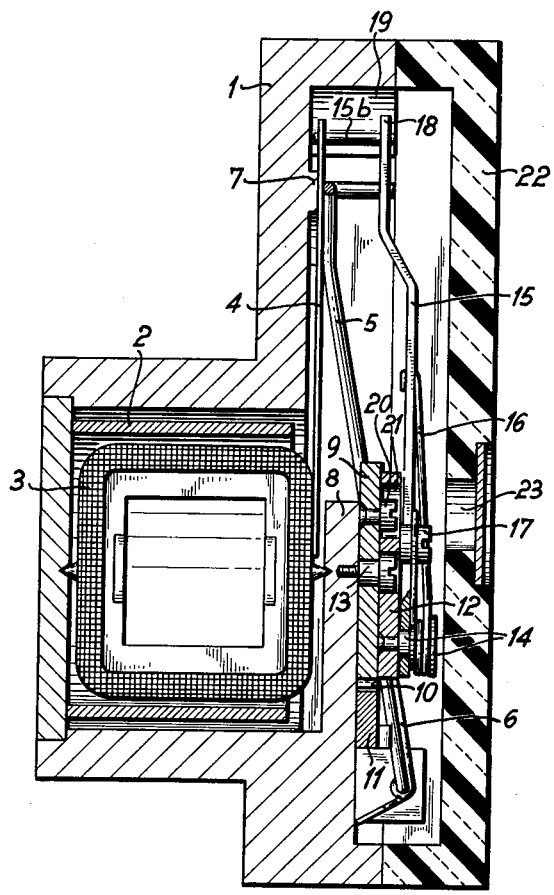
FIG. 2 is a longitudinally sectional view through the device shown in FIG. 1.

Referring to FIGS. 1 and 2, an exposure meter housing 1 is illustrated as having mounted therein a moving coil indicating instrument including a magnetic structure 2, a moving coil 3 and a rotatable indicator or pointer 4. A yoke 5 is pivoted to the housing 1 and biased by a torsion spring 6 toward a fixed surface 7 immediately adjacent but normally spaced from pointer 4. When yoke 5 is released, in a manner described more fully hereinafter, it is adapted, under the influence of spring 6, to engage indicator 4 and clamp the latter against surface 7 to arrest the indicator 4 in its then indicating position. The moving coil instrument is mounted between one wall of housing 1 and a partition 8, forming part of the housing 1.

In accordance with the present invention, two superposed disks 9 and 12 are coaxially rotatably mounted on partition 8 by means of suitable means, such as a screw 13, which is coaxial with the axis of the moving coil 3 and thus with the pivot axis of pointer 4. Lower disk or inner disk 9 has rack teeth 10 disposed along a preselected arc of its circular periphery. Teeth 10 mesh with the teeth of a rack 11a on an edge of a slide 11 connected to the exposure condition setting means of the camera. As the particular connections form no part of the invention, they have not been illustrated except for the slide 11. For a purpose to be described, a side surface of slide 11 is formed with or carries a wedge 11b.

A reset indicator or scanner member 15 is pivoted on a bolt 14 mounted eccentrically on the upper disk 12, a light spring 16 biasing the indicator 15 so that its surface 15a engages an eccentric 17 angularly adjustably mounted on the upper or outer disk 12. By angular adjustment of eccentric 17, the angle α between pointer 4 and scanner member 15, formed when a pin 15b on member 15 engages with pointer 4 in the scanning position of member 15, can be adjusted.

During rotation of the disks 9 and 12, the outer or free end 18 moves in slightly radially spaced relation to a fixed arcuate clamping surface 19 of housing 1. In the embodiment of FIGS. 1 and 2, the center of curvature of surface 19 is substantially coincident with the substantially aligned axes of rotation of pointer 4 and disks 9 and 12. Due to the eccentric mounting of member 15 on disk 12, the outer end 18 of member 15 when the discs are stationary and members 15 pivots about bolt 14, describes an arc which intersects the arcuate surface 19. The tangents to these two arcs, taken at the point of intersection thereof, form an angle β which, in the embodiment of FIGS. 1 and 2, corresponds to the angle α.

The upper disk 12 can be angularly adjusted relative to the lower disk 9 by means of an eccentric 20 angularly adjustable on disk 9 and engaged through an elongated, substantially radially extending slot 21 in disk 12. Adjustment of eccentric 20 effects angular relative displacement of all of the elements mounted on the disk 12. Angular adjustment of eccentric 20 thus adjusts the distance or spacing of the outer end 18 of member 15 relative to the arcuate clamping surface 19. This will be clear if, starting from the stationary position shown in FIG. 1, eccentric 20 is operated to adjust disk 12 counterclockwise relative to disk 9. Bolt 14 will be moved closer to surface 19, and so will end 18 of member 15.

As best seen in FIG. 2, housing 1 is provided with a cover 22, preferably made of transparent plastic material, and formed with a bore or opening 23, which may be suitably closed by a cover plate, the bore 23 providing access for adjustment of eccentrics 17 and 20, by means of a screwdriver, when the exposure meter housing is already closed, as well as when the exposure meter housing, as a unit, has been mounted in the camera.

The arrangement shown in FIGS. 1 and 2 operates in the following manner. In the rest position of the parts, slide 11 is spring biased to the left, as viewed in FIG. 1, to an extent such that wedge 11b engages beneath the left arm of yoke 5. This moves yoke 5 away from pointer 4 and clamping surface 11 so that pointer 4 can move freely through its indicating range. Also, the resultant clockwise rotation of disks 9 and 12, by slide 11, moves scanner member 15 to the right and out of the range of movement of pointer 4.

By the actuation of suitable means, such as exposure condition setter, slide 11 is moved to the right or in a direction opposite to the arrow, thus causing the disk 9 to be rotated counterclockwise through the medium of rack 11a and teeth 10 on the disk 9. At the start of such movement of slide 11, wedge 11b disengages yoke 5 so that the yoke, under the bias of spring 6, engages pointer 4 and firmly clamps the pointer against surface 7, thus firmly arresting pointer 4 in its indicating position. Scanner member 15 is simultaneously moved to the start of the indicating range of pointer 4 and, upon continued rightward movement of slide 11, member 15 sweeps to the left through this range to engage its pin 18 with the pointer 4. The arrested indicating position of pointer 4 will correspond to the luminous flux incident upon the photoelectric cell of the exposure meter.

When pin 15b of scanner member 15 engages the pointer 4, upon further rotation of disk 9, the surface 15a of scanner member 15 moves away from the eccentric 17 in opposition to the relatively light force of spring 16, and the clamping surface 18 on the free outer end of the scanner 15 engages the fixed clamping surface 19 on the housing, thus effectively arresting movement of scanner member 15. The greater the force applied to move slide 11 to the right, the firmer is the clamping effect between scanner member end 18 and surface 19. As a result, all exposure condition setting movements associated with travel of slide 11, such as movements of the shutter time adjusting ring, the diaphragm setting ring, or an exposure value setting ring, are arrested in agreement with the exposure value indicated by pointer 4.

The aforementioned slide actuating means (not shown) can be coupled with the camera release key so that the shutter is triggered once the scanner member 15 is locked in its scanning position. Following the shutter release, the scanner member 15 is released from its clamping position by spring biased movement of slide 11 to its "rest" position, and the clamping yoke 5 is lifted or moved away from surface 7 by engagement of wedge means 11b with yoke 5 to lift the latter to release pointer 4 for free movement over its indicating range as determined by the light flux incident upon the photocell.

By proper adjustment of the eccentrics 17 and 20, the scanner member 15 may be adjusted to assume an arresting position wherein a substantially frictionless scanning and clamping action is obtained, and wherein excessive stresses on pointer 4 are avoided.

Figure 3:
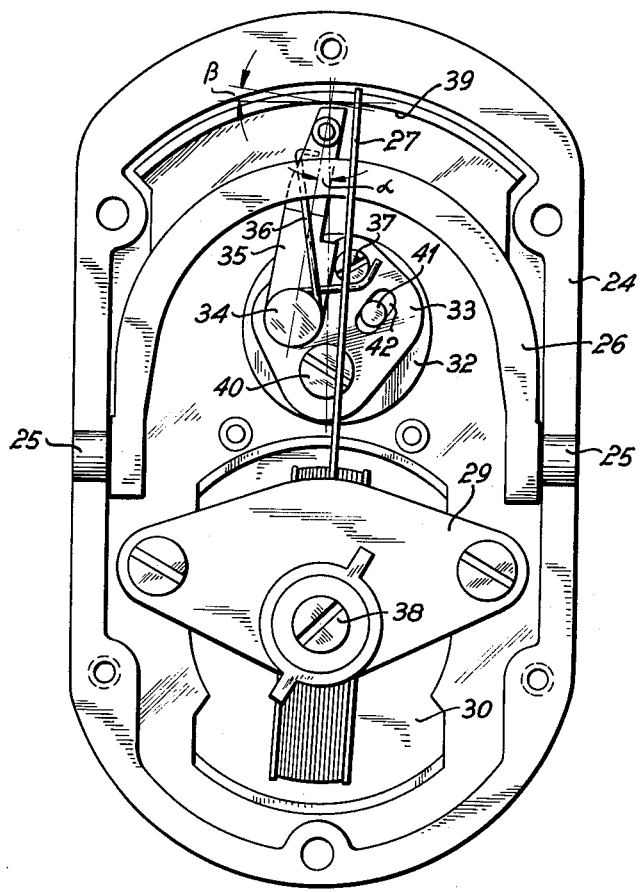
FIG. 3 is a plan view of another form of mechanical scanning device embodying the invention.
Figure 4:
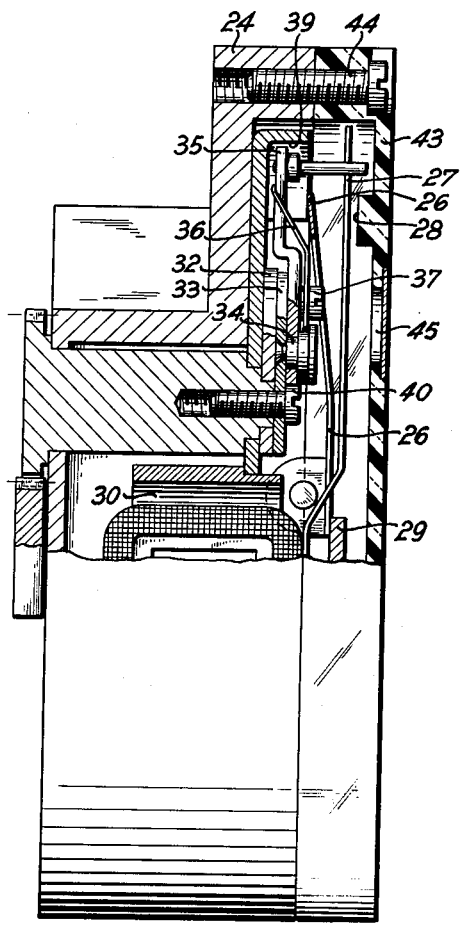
FIG. 4 is a partially side elevational and partial longitudinal sectional view of the device shown in FIG. 3.

In the arrangement shown in FIGS. 3 and 4, a clamping yoke 26 is mounted on bearings 25 and, as distinguished from the arrangement shown in FIGS. 1 and 2, is biased toward the cover 43 of the exposure meter housing 24. Yoke 26 is arranged to clamp the exposure meter pointer 27 against a holding or clamping surface 28 of the cover. In this arrangement, the moving coil instrument 30, instead of being mounted adjacent or behind the scanning mechanism, is mounted beneath it in the position shown in FIGS. 3 and 4. The moving coil instrument 30 is again mounted between a wall of housing 24 and a partition 29 preferably forming part of the housing.

The scanning mechanism includes a disk 32 on which is displaceably mounted a disk 33 which, through an eccentric bolt 34, pivotally supports a reset indicator or scanner member 35. A spring 36 biases scanner member 35 to engage an eccentric 37 angularly adjustable on the disk 33, so that any adjustment of eccentric 37 varies the value of the angle α between the pointer 27 and scanner member 35 when the latter is in its scanning position. At the same time, the angle β, formed by the tangents, at the point of intersection, to the arcuate clamping surface 39 and the arc described by the outer end of scanner member 35, is varied. In this case, the center of curvature of the clamping surface 39 is the axis of the bolt 40, and it will be noted that this axis is spaced substantially from the axis of the moving coil instrument 30, which is indicated at the bolt 38 of FIG. 3. Thereby, in the arrangement shown in FIGS. 3 and 4, there is no definite relation between angle α and angle β. Angle α varies along the path of movement of pointer 27 and scanner member 35.

The disks 32 and 33 are pivoted to the exposure meter housing 24 by means of the bolt 40. A second eccentric 41, angularly adjustable on the disk 32 and engaged through an elongated substantially radial slot 42 in disk 33, serves for adjustment of disk 33, and the parts mounted thereon relative to disk 32. This, in turn, adjusts the distance between the outer end of scanner member 35 and the arcuate surface 39. Housing cover 43 is connected to housing 24 by means of screws 44, and is provided with an aperture 45 adjacent the adjusting mechanism so that it is possible to adjust the eccentrics 37 and 41 after the exposure meter has been mounted in the camera.

The arrangement shown in FIGS. 3 and 4 functions in the same manner as that shown in FIGS. 1 and 2, and may be coupled with the exposure condition setting means of the camera in a similar manner.

While specific embodiments of the invention have been shown and described in detail to illustrate the application of the principles of the invention, it will be understood that the invention may be embodied otherwise without departing from such principles.

What is claimed is:

1. A mechanical scanning device for indicating the position of the pointer of an indicating meter movable over an indicating range, said device comprising, in combination, means formng a supporting surface extending through the range of movement of the pointer; a clamping member movable between a clamping position clamping the pointer against said surface and a release position providing for free movement of the pointer; means operable to move said clamping member between its two positions; carrier means rotatable about a fixed axis; a relatively elongated scanning member; means pivotally mounting said scanning member, at one end, on said carrier means for rotation with the latter, said scanning member having a free end arranged to follow the movement of the pointer, during rotation of said carrier means, and having a rest position outside the indicating range of the pointer and a scanning position relative to the pointer; a stop on said carrier means; a relatively weak spring biasing said scanner member to engage said stop; means forming a circular arcuate clamping surface cooperable with the free end of said scanner member for arresting said scanner member in its scanning position, the free end of said scanner member being spaced a short distance from said clamping surface except in the scanning position of said scanner member; said scanner member, when engaged with said stop, forming, with the radius of said clamping surface, an angle less than the angle of friction between the free end of said scanner member and said clamping surface; means operable to rotate said carrier means about its axis to move said scanner member toward its scanning position; said scanner member, when contacting the pointer in its scanning position, being swung away from said stop to frictionally engage its free end with said clamping surface to lock said scanner member and the components of the scanning device in the indicating position of the pointer; and adjusting means on said carrier means operable to adjust said scanner member relative to said clamping surface to pre-set the relation between the free end of said scanner member and said clamping surface.

2. A mechanical scanning device, as claimed in claim 1, in which said adjusting means is operable to move said scanner member bodily toward and away from said clamping surface to pre-set the spacing between the free end of said scanner member and said clamping surface.

3. A mechanical scanning device, as claimed in claim 1, in which said scanner member, in its scanning position, extends at an angle to the pointer; said adjusting means including said stop and being operable to adjust said last-mentioned angle.

4. A mechanical scanning device, as claimed in claim 3, in which said adjusting means is operable to move said scanner member bodily toward and away from said clamping surface to pre-set the distance between the free end of said scanner member and said clamping surface.

5. A mechanical scanning device, as claimed in claim 1, in which said indicating meter is a photographic exposure meter including a housing; said carrier means including first and second superposed disks coaxially rotatably mounted in said housing; said carrier means rotating means being operatively connected to said first disk; said scanner member being eccentrically pivoted on said second disk; said second disk being angularly adjustable relative to said first disk and being included in said adjusting means.

6. A mechanical scanning device, as claimed in claim 5, including an eccentric adjustably mounted on said first disk and engaged in an elongated substantially radial slot in said second disk; said eccentric and said slot being included in said adjusting means.

7. A mechanical scanning device, as claimed in claim 5, in which said stop comprises an eccentric angularly adjustable on said second disk for adjustment of the angle between said scanner member and the pointer in the scanning position of said scanner member.

8. A mechanical scanning device, as claimed in claim 5, including a first eccentric angularly adjustable on said first disk and engaged in an elongated substantially radial slot in said second disk; said stop comprising a second eccentric angularly adjustable on said second disk for adjustment of the angle between said scanner member and the pointer in the scanning position of said scanner member; said eccentrics being included in said adjusting means.

9. A mechanical scanning device, as claimed in claim 8, in which said first and second eccentrics have exposed operating heads; said housing including a cover having an aperture aligned with said eccentrics for access to the latter for adjustment thereof after assembly of the scanning device.

10. A mechanical scanning device, as claimed in claim 9, in which said cover is formed of transparent material.

11. A mechanical scanning device, as claimed in claim 1, in which the pointer is rotatable; the axes of rotation of the pointer and of said carrier means being aligned.

12. A mechanical scanning device, as claimed in claim 5, in which the pointer is rotatable about an axis; the axis of rotation of said first and second disks being spaced from the axis of rotation of the pointer; the center of curvature of said clamping surface being substantially coincident with the axis of rotation of said disks.

13. A mechanical scanning device, as claimed in claim 1, in which the pointer is rotatable about an axis; the axis of rotation of said first and second disks being spaced from the axis of rotation of the pointer.

14. A mechanical scanning device, as claimed in claim 1, including a cover for said housing; said supporting surface being provided on said cover.

15. A mechanical scanning device, as claimed in claim 9, said supporting surface being formed on said cover.

References Cited in the file of this patent

UNITED STATES PATENTS

| | | |
|---|---|---|
| 2,982,190 | Fischer | May 2, 1961 |
| 2,996,964 | Fischer et al. | Aug. 22, 1961 |
| 3,011,415 | Fischer et al. | Dec. 5, 1961 |